United States Patent [19]

Adcock

[11] 4,288,898
[45] Sep. 15, 1981

[54] CONTROL ROD DRIVE MECHANISM CLOSURE DEVICE

[75] Inventor: Marty E. Adcock, Logan, Ohio

[73] Assignee: The Babcock & Wilcox Company, New Orleans, La.

[21] Appl. No.: 86,986

[22] Filed: Oct. 22, 1979

[51] Int. Cl.³ .............................................. B66F 3/24
[52] U.S. Cl. ....................................... 29/240; 29/252; 254/93 R
[58] Field of Search .................. 81/3.1 R, 3.2 R, 3 R, 81/54; 292/256.6, 256, 256.71, 256.73; 138/89, 94, 96 T; 220/327, 328, 319; 29/240, 234, 237, 252; 254/93 R

[56] References Cited

U.S. PATENT DOCUMENTS

| 3,449,860 | 6/1969 | Franks et al. | 220/327 |
| 3,685,124 | 8/1972 | Wuertz | 29/240 |
| 3,830,536 | 8/1974 | Frisch et al. | 292/256.73 |

*Primary Examiner*—Robert C. Watson
*Attorney, Agent, or Firm*—James A. Hudak; Vytas R. Matas; Robert J. Edwards

[57] ABSTRACT

A device (10) for compressing a closure assembly (82) and an O-ring (80) within a control rod drive mechanism for a nuclear reactor in order to seal same. The device (10) applies a predetermined compressive force to the closure assembly (82) and O-ring (80) and has incorporated therein an angularly movable sleeve (18) which engages a lock nut (98) and threadably advances same within the control rod drive mechanism so as to engage the closure assembly (82) and apply the predetermined compressive force to assembly (82) and O-ring (80). After depressurization, lock nut (98) retains closure assembly (82) and O-ring (80) within the control rod drive mechanism by a predetermined residual compressive force.

10 Claims, 6 Drawing Figures

CONTROL ROD DRIVE MECHANISM CLOSURE DEVICE

TECHNICAL FIELD

The present invention relates generally to a device to assist in the closing of a tubular object, and more particularly to a device for compressing and sealing a closure assembly within a control rod drive mechanism housing for a nuclear reactor.

BACKGROUND ART

Control rod drive mechanisms for nuclear reactors typically require O-ring means for sealing the top closure, and these O-rings typically require the application of a predetermined amount of compressive force to seal properly. The conventional approach for applying this predetermined compressive force is by means of six jacking bolts evenly spaced on a bolt circle so as to apply an evenly distributed compressive force to the O-ring. When jacking bolts are used, it is necessary to torque the jacking bolts to a predetermined total torque in predetermined torque increments resulting in a multiplicity of torquing operations. Such torquing operations are very time consuming and the related apparatus, viz., jacking bolts and the abutment device for retaining same, is expensive. In addition, the cleaning and lubrication of the jacking bolts, which is required each time the closure assembly is removed, is a very time consuming operation.

Because of this it has been desirable to develop a device that evenly compresses the subject O-ring with a predetermined compressive force and permits retention of the O-ring in a compressed state after the device has been removed from the control rod drive mechanism.

SUMMARY OF THE INVENTION

The present invention solves the aforementioned problems associated with the prior art as well as other problems by providing a device which evenly compresses the subject O-ring with a predetermined compressive force so that a lock nut can be threadably engaged to retain the O-ring in the compressed state. The device is threadably attached to the end of a control rod device mechanism and includes a hydraulically actuated piston which compresses the closure assembly and the subject O-ring within the control rod drive mechanism by a predetermined compressive force. After compression, a locking nut is threadably advanced within the control rod drive mechanism so as to engage the closure assembly and apply a compressive force to this assembly and the subject O-ring. The device is then depressurized and removed from the control rod drive mechanism, and the lock nut retains the subject O-ring in a compressed state by means of a predetermined residual compressive force.

In view of the foregoing, it will be seen that one aspect of the present invention is to provide a device for evenly compressing a closure assembly and a sealing O-ring within a control rod drive mechanism by a predetermined residual compressive force.

Another aspect of the present invention is to provide apparatus which can retain the closure assembly and the sealing O-ring for a control rod drive mechanism in a compressed state after the device for compressing same has been removed from the control rod drive mechanism.

A still another aspect of the present invention is to provide a device for recompressing a closure assembly and a sealing O-ring within a control rod drive mechanism by a predetermined compressive force so that the apparatus which retains the closure assembly and the sealing O-ring in a compressed state can be disengaged permitting the removal of the closure assembly from the control rod drive mechanism.

These and other aspects of the invention will be more clearly understood after a review of the following description of the preferred embodiment when considered with the drawings.

DESCRIPTION OF THE PREFERRED EMBODIMENT

Figure 1:
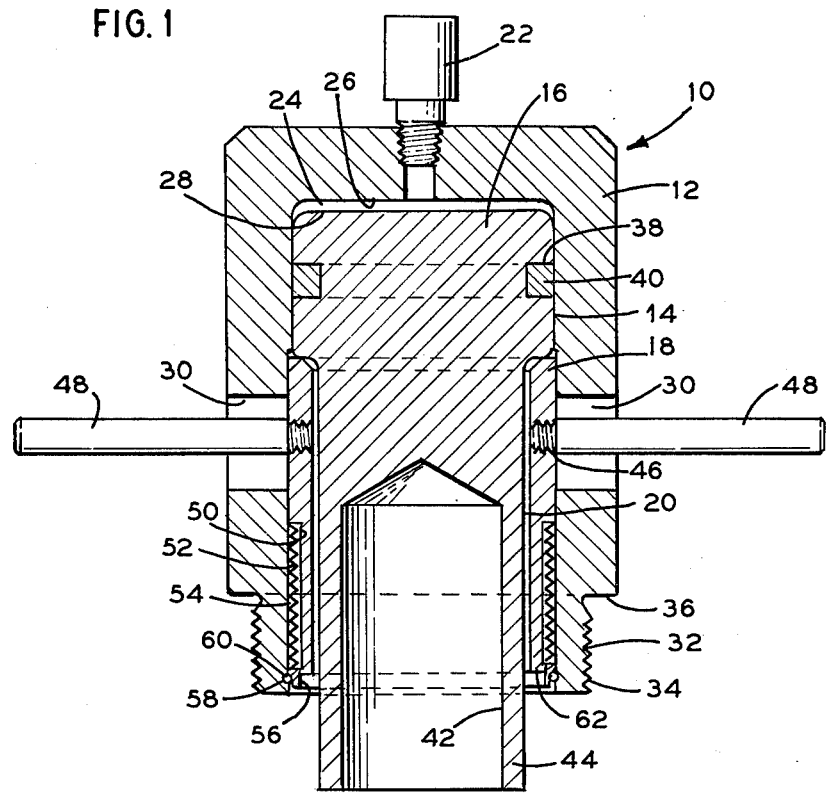
FIG. 1 is a cross-sectional view of the present invention.

Referring now to the drawings wherein the illustrations are for the purpose of describing the preferred embodiment of the invention and are not intended to limit the invention hereto, FIG. 1 shows a cross-sectional view of the closing device 10. Closing device 10 is composed of an outer housing 12 having a blind bore 14 therein, a piston 16 slidingly received in blind bore 14, and a sleeve 18 received over a reduced diameter portion 20 of piston 16.

Housing 12 has a swivel hydraulic fitting 22 at one end thereof for the introduction of hydraulic fluid into a chamber 24 formed in blind bore 14 between the inner base 26 of housing 12 and transverse surface 28 of piston 16. The outer wall of housing 12 has two circumferential openings 30 spaced 180° apart and each having an angular length of at least 45° and a width sufficient to permit a handle, hereinafter described, to have substantial axial movement therewithin. Openings 30 permit access to the interior of housing 12 so that sleeve 18 can be turned. The open end of housing 12 has a reduced diameter portion 32 with threads 34 over a portion thereof and forming a shoulder 36 at the intersection of reduced diameter portion 32 and the outer surface of housing 12. Threads 34 permit attachment of device 10 to a control rod drive mechanism.

Piston 16 has an annular groove 38 at one end thereof to receive an O-ring 40 which forms a seal between piston 16 and bore 14 of housing 12. A blind bore 42 is centrally located in the end of piston 16 forming a cylindrical wall 44 between blind bore 42 and reduced diameter portion 20. The diameter of blind bore 42 is slightly greater than the diameter of the upper hub portion of the closure assembly for the control rod drive mechanism and the depth thereof is slightly greater than the length of same.

Figure 2:
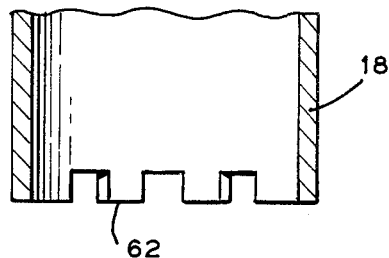
FIG. 2 is a cross-sectional view of the castellations provided on the end of the rotatable sleeve used in the present invention.

Sleeve 18 has two apertures 46 spaced 180° apart on the periphery thereof and on a circumference which is aligned with circumferential openings 30 when device 10 is assembled. A handle 48 is received through each circumferential opening 30 and received in each aperture 46 permitting the turning of sleeve 18 with respect to housing 12. The portion of sleeve 18 adjacent to the open end of housing 12 has a reduced diameter 50 allowing the receipt of a spring 52 in a cavity 54 formed between reduced diameter portion 50 and housing bore 14. Spring 52 is retained in cavity 54 by means of a lock ring 56 received in the end of cavity 54 and secured therein by a retaining ring 58 received in an annular groove 60 in housing bore 14 and contacting the periphery of lock ring 56. The end of sleeve 18 adjacent the open end of housing 12 is provided with equally spaced castellations 62 around the periphery thereof, as shown in FIG. 2. Spring 52 biases sleeve 18 into a retracted position on piston 16 and within housing 12 so that castellations 62 do not interfere with the attachment of device 10 to a control rod drive mechanism.

Figure 3:
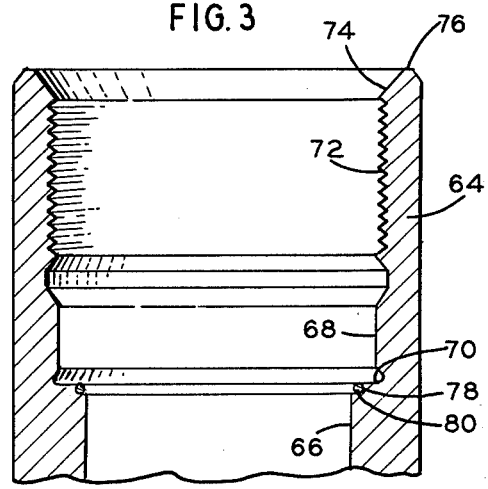
FIG. 3 is a cross-sectional view of a typical control rod drive mechanism to be sealed by using the present invention.

The portion of the control rod drive mechanism to be closed is shown in FIG. 3 and is primarily a tubular housing 64 having a first bore 66 which intersects a second bore 68 forming a shoulder 70. First bore 66 has a diameter slightly greater than that for the lower hub portion of the closure assembly while second bore 68 has a diameter slightly greater than that for the sealing portion of the closure assembly. A portion of second bore 68 has threads 72 formed therein of the same pitch as threads 34 on housing 12 so as to properly mate therewith. The axial length of threads 72 is greater than the combined axial length of threads 34 on housing 12 and the axial length of the threads provided on a lock nut hereinafter described. A chamfered surface 74 is provided between the end of threads 72 and a transverse surface 76 formed at open end of tubular housing 64. This chamfered surface acts as a piloting surface for the attachment of device 10 to tubular housing 64. An annular recess 78 is provided in shoulder 70 to receive an O-ring 80 which is compressed by the closure assembly through the use of the present invention.

Figure 4:
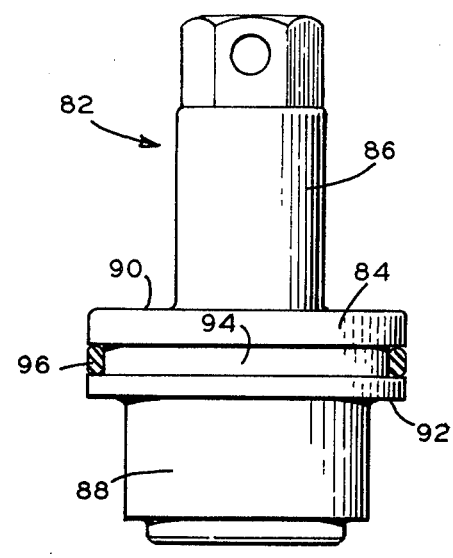
FIG. 4 is a front elevation view of a typical closure assembly used for sealing a control rod drive mechanism such as that illustrated in FIG. 3.

FIG. 4 illustrates a typical closure assembly, shown generally as the numeral 82, and comprised of a sealing portion 84, an upper hub portion 86, and a lower hub portion 88. The intersection of upper hub portion 86 with sealing portion 84 forms a transverse surface 90 while the intersection of sealing portion 84 with lower hub portion 88 produces an annular shoulder 92. Sealing portion 84 has an annular recess 94 provided therein which receives an O-ring 96. When closure assembly 82 is inserted into tubular housing 64 and is compressed therein, O-ring 96 forms a seal with second bore 68 of tubular housing 64 and O-ring 80 is compressed between annular recess 78 in shoulder 70 and annular shoulder 92 on the bottom of sealing portion 84 forming a firm seal between sealing portion 84 and tubular housing 64.

Figure 5:
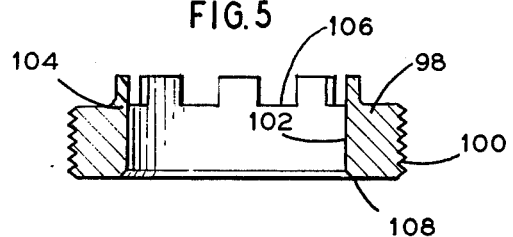
FIG. 5 is a cross-sectional view of a lock nut used for applying a compressive force to a closure assembly, such as that illustrated in FIG. 4, when installed in a control rod drive mechanism.
Figure 6:
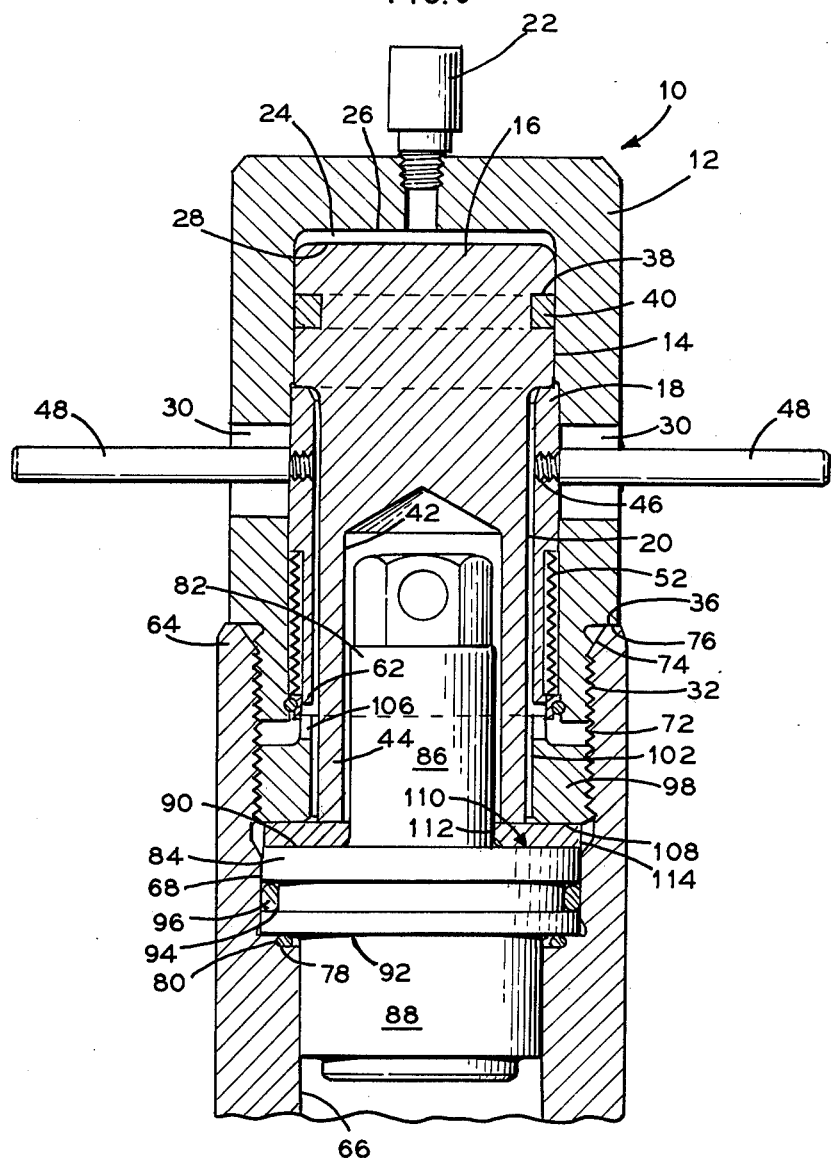
FIG. 6 is a cross-sectional view of the present invention threadably attached to a typical control rod drive mechanism and illustrating the compression of a closure assembly and a sealing O-ring within the control rod drive mechanism and the use of a lock nut to retain the closure assembly and the sealing O-ring in a compressed state.

Compression of closure assembly 82 is accomplished by a lock nut 98, shown in FIG. 5, having threads 100 on the outer periphery of the same pitch as threads 72 in tubular housing 64 and having an inner diameter 102 slightly greater than that of reduced diameter portion 20 of piston 16. One side of lock nut 98 is provided with a boss 104 into which are formed castellations 106 which mate with castellations 62 provided on the end of sleeve 18. The other side of lock nut 98 is flat so as to provide a smooth surface 108 for contact with a bearing plate 110 interposed between surface 108 and transverse surface 90 on top of sealing portion 84 when closure assembly 82 is inserted into a control rod drive mechanism. Bearing plate 110, shown in FIG. 6, has an inner diameter 112 slightly larger than the diameter of upper hub portion 86 and an outer diameter 114 slightly smaller than second bore 68 in tubular housing 64 so as to be easily receivable on upper hub portion 86 and in second bore 68 when device 10 is attached to tubular housing 64 in order to seal same.

When it is desired to seal a control rod drive mechanism, a closure assembly 82 is inserted into tubular housing 64, and is advanced therein until annular shoulder 92 on sealing portion 84 contacts O-ring 80. In this position, O-ring 96 firmly contacts second bore 68 of tubular housing 64 forming a firm seal therebetween. Bearing plate 110 is then received on upper hub portion 86 of closure assembly 82 and is advanced thereon until it contacts transverse surface 90 provided on sealing portion 84 of closure assembly 82. Lock nut 98 is then received on upper hub portion 86 and threadably advanced within tubular housing 64 until surface 108 on the bottom thereof contacts bearing plate 110. Device 10 is then aligned with tubular housing 64 and threadably advanced therein until shoulder 36 on housing 12 contacts transverse surface 76 on tubular housing 64. In this position, cylindrical wall 44 of piston 16 is interposed between upper hub portion 86 of closure assembly 82 and inner diameter 102 of lock nut 98. During this attachment process, spring 52 biases sleeve 18 into a retracted position on reduced diameter portion 20 of piston 16 and within housing 12 preventing castellations 62 on sleeve 18 from contacting castellations 106 on lock nut 98 which would hinder the attachment process.

After attachment of device 10 to tubular housing 64, chamber 24 is pressurized by the introduction of hydraulic fluid through hydraulic fitting 22. This hydrualic fluid applies a force to transverse surface 28 of piston 16 causing axial movement thereof resulting in piston 16 applying a compressive force to bearing plate 110 which is transmitted through sealing portion 84 of closure assembly 82 to O-ring 80. The hydraulic pressure introduced into chamber 24 can be regulated so that a predetermined compressive force is applied to O-ring 80 thus insuring that it will seal properly. This predetermined compressive force is greater than the desired residual compressive force to compensate for relaxation of lock nut 98, and threads 72 and 100 on housing 64 and nut 98, respectively after depressurization.

While chamber 24 is pressurized, handles 48 are depressed so that castellations 62 on sleeve 18 mate with castellations 106 on lock nut 98 and are angularly moved within circumferential openings 30 resulting in the angular movement of sleeve 18 and the threaded advancement of lock nut 98 within tubular housing 64. When handles 48 contact the end of circumferential openings 30, they are released allowing sleeve 18 to retract on reduced diameter portion 20 of piston 16. Handles 48 are then angularly moved until they contact the opposite end of circumferential openings 30. The handles 48 are then depressed causing castellations 62 on sleeve 18 to mate with castellations 106 on lock nut 98 permitting further threaded advancement of lock nut 98 within tubular housing 64 by further angular movement of handles 48 and sleeve 18. This process is continued until lock nut 98 firmly engages bearing plate 110 and is thus applying the predetermined desired compressive force to O-ring 80. Handles 48 are then released allowing sleeve 18 to return to its retracted position on reduced diameter portion 20 of piston 16. Device 10 is then depressurized and removed from tubular housing 64 by angularly turning handles 48 so as to contact the end of circumferential openings 30.

To remove a closure assembly, the entire process is reversed, i.e., chamber 24 is pressurized to the pressure level which applied the predetermined compressive force to O-ring 80. This pressurization permits lock nut 98 to be loosened so that it can be threadably withdrawn from tubular housing 64.

Certain modifications and improvements will occur to those skilled in the art upon reading the foregoing description. It will be understood that all such improvements and modifications have been deleted herein for the sake of conciseness and readability but are properly within the scope of the following claims.

I claim:

1. A device for compressing a first member within a second member comprising a body portion having a bore therein and being attachable to said second member, piston means slidably receivable within said bore in said body portion and having a bore therein for the receipt of said first member, a sleeve member adjacent said piston means and axially movable therewith, and means for pressurizing said bore within said body portion causing axial movement of said piston means and said sleeve member resulting in the compression of said first member within said second member.

2. The compressing device as defined in claim 1 wherein said sleeve member is axially movable with said piston means and is angularly movable with respect to said piston means and said body portion and has engagement means provided on the end thereof adjacent the end of said body portion attached to said second member.

3. The compressing device as defined in claim 1 further including means for biasing said sleeve member into a retracted axial position on said piston means.

4. The compressing device as defined in claim 2 further including fastening means received over said first member and operatively engagable with said second member, said fastening means having engagement means provided thereon which mate with said engagement means provided on said sleeve member resulting in the angular movement of said fastening means as said sleeve member is angularly moved.

5. The compressing device as defined in claim 4 further including a bearing member interposed between said fastening means and said first member.

6. The compressing device as defined in claim 4 wherein said sleeve member is interposed between said body portion and said piston means and said fastening means has an aperture therein for the receipt of said piston means permitting said piston means to operatively engage said first member.

7. The compressing device as defined in claim 1 further including means for sealing said first member within said second member, said sealing means comprising a sealing ring interposed between mating transverse surfaces provided on said first member and said second member.

8. The compression device as defined in claim 7 wherein said sealing means further includes a sealing ring interposed between mating axial surfaces on said first member and said second member.

9. A device for compressing a first member within a second member comprising a body portion having a bore therein and being attachable to said second member, piston means slidably receivable within said bore in said body portion and having a bore therein for the receipt of said first member, a sleeve member adjacent said piston means and axially movable therewith and angularly movable with respect to said piston means and said body portion, means for biasing said sleeve means into a retracted axial position on said piston means, and means for pressurizing said bore within said body portion causing axial movement of said piston means and said sleeve member resulting in the compression of said first member within said second member.

10. A device for compressing a first member within a second member comprising a body portion having a bore therein and being attachable to said second member, piston means slidably receivable within said bore in said body portion and having a bore therein for the receipt of said first member, a sleeve member interposed between said body portion and said piston means and axially movable with said piston means and angularly movable with respect to said piston means and said body portion, said sleeve member having engagement means provided on the end thereof adjacent the end of said body portion attached to said second member, means for biasing said sleeve means into a retracted axial position on said piston means, and means for pressurizing said bore within said body portion causing axial movement of said piston means and said sleeve member resulting in the compression of said first member within said second member.

* * * * *